(12) United States Patent
Van Casteren

(10) Patent No.: US 6,919,696 B2
(45) Date of Patent: Jul. 19, 2005

(54) DEVICE FOR OPERATING A HIGH-PRESSURE DISCHARGE LAMP

(75) Inventor: Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/483,864

(22) PCT Filed: Jun. 5, 2002

(86) PCT No.: PCT/IB02/02052
§ 371 (c)(1),
(2), (4) Date: Jan. 14, 2004

(87) PCT Pub. No.: WO03/009650
PCT Pub. Date: Jan. 30, 2003

(65) Prior Publication Data
US 2004/0183460 A1 Sep. 23, 2004

(30) Foreign Application Priority Data
Jul. 19, 2001 (EP) .......................... 01202766

(51) Int. Cl.$^7$ .................................. G05F 1/00
(52) U.S. Cl. .............. 315/291; 315/307; 315/224; 315/209 R
(58) Field of Search .................. 315/291, 307, 315/224, 225, 209 R, 247, 311

(56) References Cited
U.S. PATENT DOCUMENTS
6,316,888 B1 * 11/2001 Raiser .................. 315/307
6,381,551 B1 * 4/2002 Raiser .................. 702/107

* cited by examiner

*Primary Examiner*—Tuyet Thi Vo
(74) *Attorney, Agent, or Firm*—Dicran Halajian

(57) ABSTRACT

The present invention relates to an Electronic ballast for operating a high-pressure discharge lamp, comprising a switched-mode power supply circuit (SMPS) for supplying a rail voltage Vrail to the high pressure discharge lamp, the power supply circuit comprising a half bridge commutating forward circuit including an inductance (Lhbcf), a capacitor circuit of a first capacitor (Cs1) and a second capacitor (Cs2) in series, the lamp (LA) being connectable between the inductance (Lhbcf) and a midpoint (M) between the first and second capacitor (Cs1,Cs2); a duty cycle control circuit, connected to the switched-mode power supply circuit, for controlling the duty cycle of the half bridge commutating forward circuit; and overvoltage protection means for protecting said capacitors against overvoltage, comprising—a midpoint voltage detection circuit for detecting the voltage at the midpoint between the first and second capacitor, the midpoint voltage detection circuit providing a first signal representative of the detected midpoint voltage; voltage difference determining circuit for determining the difference between the first signal and a second signal, which is representative of half the rail voltage, wherein the voltage difference determining circuit is connected to the duty cycle control circuit and the duty cycle control circuit is operable to change the duty cycle of the half bridge commutating forward circuit if the determined difference exceeds a maximum voltage difference.

10 Claims, 3 Drawing Sheets

DEVICE FOR OPERATING A HIGH-PRESSURE DISCHARGE LAMP

FIELD OF THE INVENTION

The present invention relates to a device for operating a high-pressure discharge (HID) lamp.

DESCRIPTION OF THE RELATED ART

For operating discharge lamps electronic ballast circuits are known comprising a switched-mode power supply (SMPS) connected between the mains and the lamp. In a three stage ballast circuit the first stage of the switched-mode power supply comprises a preconditioner, for example a double rectifier for rectifying the mains (230 V, 50 Hz, 2 phase), combined with an up-converter. The second stage may comprise a down-converter (DC-DC converter), also called a forward or buck converter, for stabilizing the output current. The third stage of the ballast circuit comprises a commutator full bridge (and ignitor) to implement a square wave current operation of the lamp. In a two-stage ballast topology the down-converter and commutator bridge are replaced by a half-bridge commutating forward (HBCF) or a full-bridge commutating forward (FBCF) topology.

The half-bridge commutating forward (HBCF) circuit corresponds to a full-bridge commutating forward (FBCF) circuit wherein a part of the bridge is replaced by two (electrolytic) bridge capacitors in series. The ballast in this topology comprises an up-converter in combination with a half bridge acting as double down-converter. This two stage ballast topology for operating a HID lamp is relatively simple and relatively inexpensive.

During the start-up phase and also at the end of the life of the lamp, the behavior of the discharge lamp may be irregular. For example, the lamp may be conductive during one half of the commutation period and non-conductive during the other part of the commutation period. In the above mentioned capacitor series circuit of the half-bridge commutating forward circuit this results in a displacement of the midpoint voltage of the half-bridge, which may cause the maximum voltage rating of one of the bridge capacitors to be exceeded. This in turn may cause damage to the capacitors and/or malfunction of the ballast circuit. Furthermore, the output voltage or rail voltage of the up-converter of the HBCF may be boosted during the start-up phase of the lamp, i.e. during ignition of the lamp, and lowered during normal operation of the lamp in order to increase the operating efficiency of the ballast. Irregular or asymmetrical behavior of the lamp during the start-up phase may therefore cause even higher levels of the midpoint voltage of the half bridge and consequently to even higher risks of damaging the bridge capacitors.

A solution to this problem might be to apply in the half-bridge of the ballast a capacitor series circuit with capacitors of enlarged maximum voltage ratings. This, however, will render the ballast more expensive and will increase the dimensions thereof.

The use of a SIDAC for providing overvoltage protection may be contemplated. However, due to the considerable power dissipation of the SIDAC itself, the power efficiency of the ballast circuit is reduced. Furthermore, during irregular (asymmetrical) operation of the lamp, in particular in an End-of-Life situation, the power supplied to the lamp may cause overheating of the lamp fixture.

SUMMARY OF THE INVENTION

The object of the present invention is to solve the above mentioned problems and to provide a relatively low cost and simple circuit arrangement for operating a high pressure lamp, wherein the power dissipation is minimized.

According to the present invention an electronic ballast for operating a high-pressure discharge lamp is provided, comprising a switched-mode power supply circuit (SMPS) for supplying a rail voltage to the high pressure discharge lamp, the power supply circuit comprising a half bridge commutating forward circuit including an inductance, a capacitor circuit of a first capacitor and a second capacitor in series, the lamp being connectable between the inductance and a midpoint between the first and second capacitor; a duty cycle control circuit, connected to the switched-mode power supply circuit, for controlling the duty cycle of the half bridge commutating forward circuit; and overvoltage protection means for protecting said capacitors against overvoltage, comprising a midpoint voltage detection circuit for detecting the voltage at the midpoint between the first and second capacitor, the midpoint voltage detection circuit providing a first signal representative of the detected midpoint voltage;

voltage difference determining circuit for determining the difference between the first signal and a second signal, which is representative of half the rail voltage, wherein the voltage difference determining circuit is connected to the duty cycle control circuit and the duty cycle control circuit is operable to change the duty cycle of the half bridge commutating forward circuit if the determined difference exceeds a maximum voltage difference. The duty cycle is changed so as to maintain the midpoint voltage within an upper limit and a lower limit. More specifically, the duty cycle of the switched mode power supply is reduced so as to keep the midpoint voltage at an upper limit level when the midpoint voltage has drifted upward or the duty cycle is increased so as to keep the midpoint voltage at a lower limit level when the midpoint voltage has drifted downward.

This will cause the midpoint voltage and hence the voltages across the bridge capacitors to be corrected to safe values. The overvoltage protection circuit in fact prevents an overvoltage situation for each of the capacitors of the capacitor series circuit. Furthermore, the duty cycle is increased or reduced in such a way, that the supply of power in the period during which the lamp is conductive (which is an example of the earlier-mentioned irregular behavior of the lamp) is minimized. This reduces the power dissipation in the ballast and development of heat in the lamp fixture.

According to a preferred embodiment the duty cycle is reduced when the midpoint voltage reaches an upper limit equal to half the rail voltage plus the maximum voltage difference, the reduction of the duty cycle resulting in a midpoint voltage equal to or lower than the upper limit, while the duty cycle is increased when the midpoint voltage reaches a lower limit equal to half the rail voltage minus the maximum voltage difference, the increase of the duty cycle resulting in a midpoint voltage equal to or higher than the lower limit.

According to a further preferred embodiment the second signal representative of half the rail voltage is a predefined signal. This relatively simple embodiment is applicable in cases wherein the rail voltage as supplied by the switched-mode power supply is constant. However, in cases with a varying rail voltage, for example in the situation wherein during the start-up phase of the lamp the rail voltage is boosted to create a sufficient open-circuit voltage, while during normal operation the rail voltage is reduced to increase the efficiency of the ballast, a further embodiment is preferred, wherein the second signal representative of half the rail voltage is provided by a detection circuit connected to the rail voltage as supplied by the switched mode power supply. The second voltage now is dependent on the actual rail voltage of the power supply, thereby providing over-voltage protection in both the normal operation period and the start-up operation period.

Preferably the midpoint voltage detection circuit is a resistive divider connected with the rail voltage and the midpoint voltage and the rail voltage detecting circuit is a resistive divider connected to the rail voltage. These circuits are relatively simple. Besides, the resistive divider connected to the capacitor midpoint is made substantially symmetrical to keep the resistive load symmetrical.

In a preferred embodiment the duty cycle control circuit comprises a frequency oscillator connected in series with a flip flop, wherein the output of the flip flop is the logic commutation signal driving the half bridge commutating forward (HBCF). This output is used to alternatively switch on and off the two half bridge switching elements of the switched-mode power supply. Preferably the flip flop is of the D type and functions inter alia as a two-times frequency divider. The frequency divider is connected in series with the oscillator to ensure a 50% duty cycle.

In a further preferred embodiment the voltage difference determining circuit comprises a first switching element ($Q_4$) which is conductive when the midpoint voltage is at the upper limit and a second switching element ($Q_3$) which is conductive when the midpoint voltage is at the lower limit. This provides one or more third output signals that indicate whether or not one of the borders of the allowable midpoint voltage range is reached. In case the first switching element ($Q_4$) is connected to the RESET input of the flip flop and the second switching element ($Q_3$) is connected to the SET input of the flip flop, the transition of the non-conducting mode to the conducting mode of respectively the first switching element or the second switching element will enforce reset-ting or setting of the flip flop. The output at the output terminal O of the flip flop will then have respectively a logic low value or a logic high value as long as either of the switching elements remains in the conducting mode. This will cause the value of the duty cycle of the ballast to be reduced or to be increased.

BRIEF DESCRIPTION OF THE DRAWINGS

Further advantages, features and details of the present invention will be elucidated with reference to the annexed drawings, in which.

DETAILED DESCRIPTION OF THE INVENTION

Figure 1:
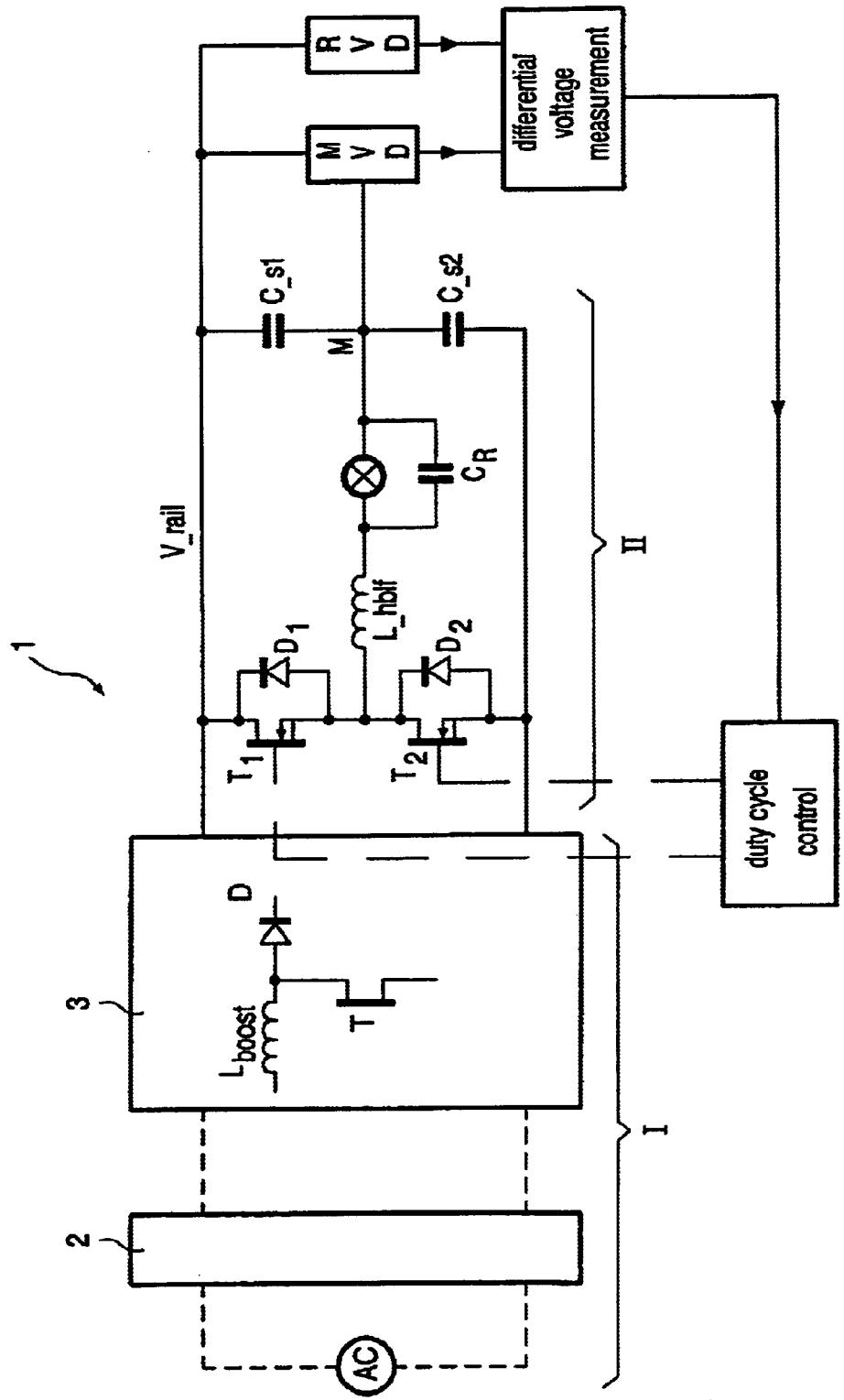
FIG. 1 shows a schematic circuit diagram of an electronic ballast according to the preferred embodiment of the present invention.

FIG. 1 shows a two-stage ballast for a high discharge lamp LA. The first stage I of the ballast comprises a rectifier 2 for converting the AC supply voltage (typically a 230 V 50 Hz mains) to a DC supply voltage and an up-converter or boost-converter 3 for boosting the DC supply voltage. In FIG. 1 a typical topology of a boost-converter or up-converter is shown. The boost-converter inter alia is composed of an inductor $L_{boost}$, a switching element T and a diode D.

During the starting phase of the lamp the output voltage or rail voltage of the switched-mode power supply SMPS is boosted to create a sufficient open circuit voltage (OCV). The open circuit voltage required in this phase of lamp operation depends on the type of HID lamp used. Typically the rail voltage is boosted during the starting phase to about 500 V to create an OCV of 250 V. During subsequent normal operation of the lamp, the rail voltage is reduced (typically to about 400 V) to increase the efficiency of the ballast.

The second stage II of the ballast comprises a half bridge commutating forward HBCF circuit acting as a double down-converter. The HBCF circuit includes a first MOSFET T1, a second MOSFET T2, a first and a second (internal) body diode $D_1$ and $D_2$, a lamp inductor $L_{hbcf}$ in series with the lamp, a lamp capacitor Cr connected parallel to the lamp, and two electrolytic bridge capacitors $C_{s1}$ and $C_{s2}$ connected in series. The bridge capacitors $C_{s1}$ and $C_{s2}$ are relatively small sized and inexpensive electrolytic capacitors, each having a maximum voltage rating of only 300 V. The half bridge commutating forward circuit is operated in the critical discontinuous mode to allow zero voltage switching. Each half commutation period (commutation frequency in the order of 100 Hz), one MOSFET (the first MOSFET T1 or the second MOSFET T2) is operated in combination with the diode (D2 or D1) of the other MOSFET.

Figure 2:
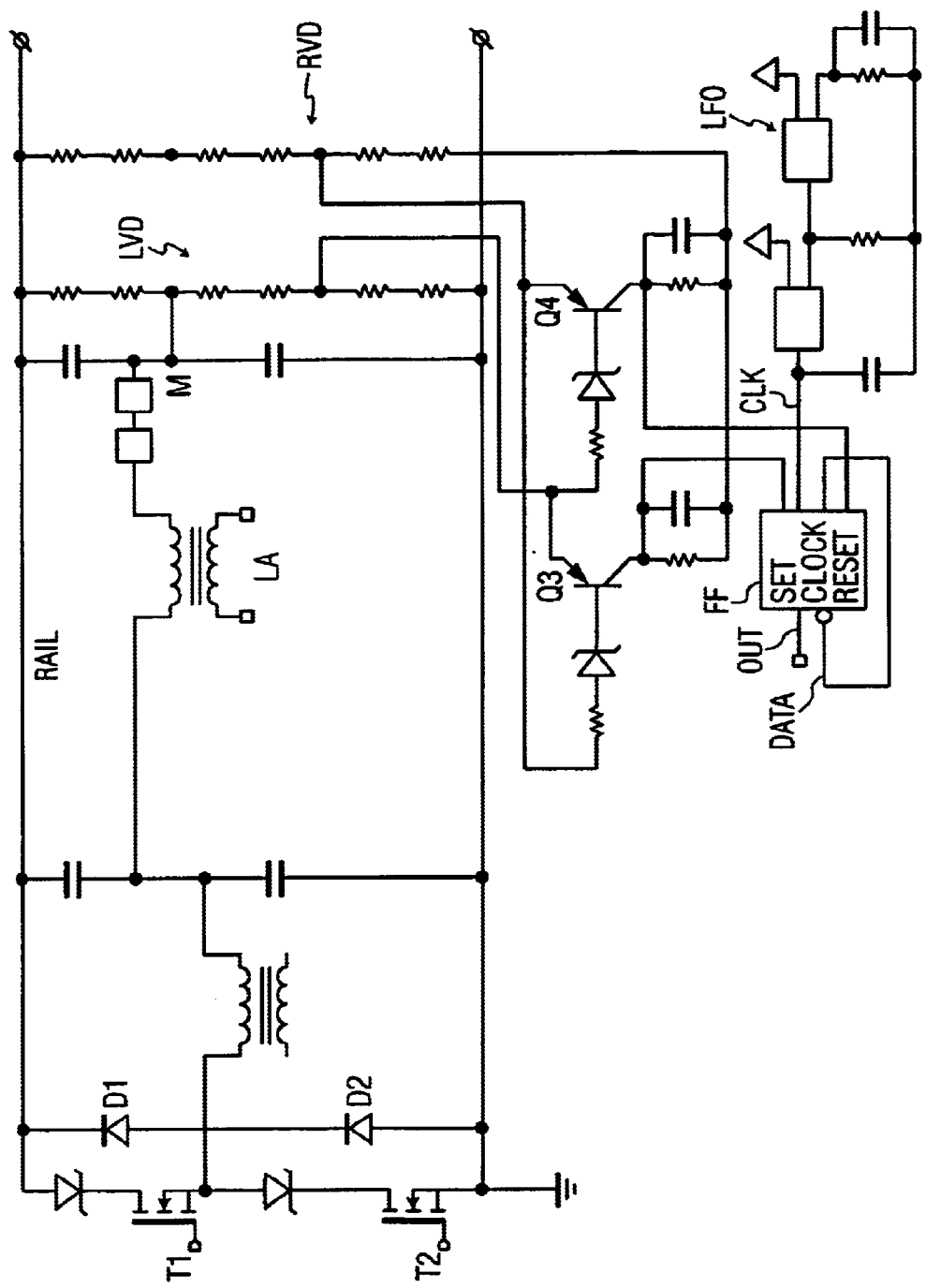
FIG. 2 shows a part of the circuit diagram of FIG. 1 in more detail.

The half bridge commutating forward circuit is operated by a duty cycle control circuit, which comprises a low-frequent oscillator LFO section, as is shown in FIG. 2 (providing a clock signal CLK, typically about 200 Hz). The oscillator is connected in series with a two-times frequency divider. The frequency divider is provided to ensure an exact 50% duty cycle. In the present embodiment, as is shown in FIG. 2, the frequency divider is built around a D type flip flop. Generally, with the data input terminal (D) tied to its own O' output terminal (which is the complement of the output terminal O), the D type flip flop sees the complement of its existing output at its D input terminal at the time of the clock pulse. The output signal is at half the frequency of the input signal. Connecting the 200 Hz output signal of the low-frequent oscillator section to the clock terminal CLK of the flip flop, the half bridge is driven with a commutation frequency of about 100 Hz.

During normal operation of the lamp, the low frequent (commutation frequency typically about 100 Hz) duty-cycle of the half bridge commutating forward circuit is 50%. The duty cycle is 50% because the "lamp" load of the half bridge will in most cases during normal operation of the lamp be symmetrical.

However, during the start phase and/or at the end of the life (EOL) of the lamp, the lamp behavior may be irregular causing an asymmetrical lamp load of the half bridge commutating forward circuit. The lamp, for example, may be conducting in one half period of the duty cycle, and may be non-conducting in the other half period. This asymmetrical load of the half bridge results in a displacement of the midpoint voltage in the capacitor series circuit $C_{s1}, C_{s2}$, that is the voltage on a position M between the first electrolytic bridge capacitor $C_{s1}$ and the second electrolytic bridge capacitor $C_{s2}$ is increased or decreased.

When the lamp LA in FIG. 1 is in a conductive state in the first half period when MOSFET T1 is conducting and MOSFET T2 is non-conducting and the lamp is in a non-conductive state in the second half period when MOSFET T1 is non-conducting and MOSFET T2 is conducting, the midpoint voltage will increase. In case of a rail voltage $V_{rail}$ of 400 V, the midpoint voltage may drift away from 200 V to voltage values exceeding the maximum voltage rating (300 V) of the second electrolytic capacitor $C_{s2}$. When, on the other hand, the lamp is in a non-conductive state in the first half period when MOSFET T1 is conducting and MOSFET T2 is non-conducting and the lamp is in a conductive state in the second half period when MOSFET T1 is non-conducting and MOSFET T2 is conducting, the midpoint voltage will decrease. In case of a rail voltage $V_{rail}$ of 200 V, the midpoint voltage may drift away from 200 V to voltage values exceeding the maximum voltage rating (300 V) of the first electrolytic capacitor $C_{s1}$.

During the start-up phase of the lamp the rail voltage is boosted to 500 V. The midpoint voltage of 250 V may drift only 50 V upward or downward to reach the maximum voltage rating of respectively the second bridge capacitor $C_{s2}$ or the first capacitor $C_{s1}$.

In order to prevent the maximum voltage rating of one of the capacitors to be exceeded, overvoltage protection means are provided. According to the embodiment shown in FIG. 1 two resistive dividers are provided. The first resistive divider is a capacitor midpoint voltage detection voltage divider MVD, which is connected to the rail voltage $V_{rail}$ on which the half bridge is operated and to the midpoint between the two bridge capacitors $C_{s1}$ and $C_{s2}$, and provides a first output signal that is representative of the detected midpoint voltage. The second resistive divider is a rail voltage divider RVD, which is connected to the rail voltage, and provides a second output signal representative of the actual rail voltage on which the half bridge is operated. When the rail voltage during the start-up phase of the lamp is boosted, as is mentioned earlier, the second divider will follow the boosted rail voltage and the second output signal will represent the actual rail voltage at this moment.

In another preferred embodiment (not shown), the rail voltage is constant during operation of the lamp. In this case the second divider can be dispensed with and the first signal from the capacitor midpoint voltage detection divider may be compared with a constant signal representing the constant rail voltage.

In FIG. 2 the capacitor midpoint voltage detection voltage divider and the rail voltage divider are shown in more detail. The capacitor midpoint voltage detection voltage divider is made symmetrical to keep the relatively small resistive load also symmetrical. In a normal situation with a symmetrical capacitor voltage distribution, the output signals of the first and second resistive dividers are equivalent.

The resistive dividers are coupled with a discrete differential voltage measurement circuit, as shown in FIG. 1. This circuit measures the voltage difference between the first signal supplied by the capacitor midpoint voltage detection voltage divider and the second signal supplied by the rail voltage divider. When the absolute value of the measured voltage difference exceeds a predefined level, a third signal representative of the value of the determined difference is provided. This signal may be proportional to the measured voltage difference value.

In the present embodiment, however, the third signal comprises in fact two signals, which in combination supply to the duty cycle control circuit (to be described hereafter) information on whether or not the maximum voltage difference has been reached and, if so, whether the lower limit or the upper limit has been reached. In the present embodiment the differential voltage measurement circuit comprises a first switching element $Q_4$ and a second switching element $Q_3$, as shown in FIG. 2. The first switching element $Q_4$ becomes conductive when the measured voltage difference exceeds positively the predefined value, that is when the measured voltage difference reaches the upper midpoint voltage limit (for example +300 V). This causes a RESET signal to be supplied to the flip flop FF of the duty cycle control circuit. The second switching element $Q_3$ becomes conductive when the measured voltage difference exceeds negatively the predefined value, i.e. when the measured voltage difference reaches the lower limit (for example +100 V). This causes a SET signal to be supplied to the flip flop.

During normal, symmetrical operation of the half bridge, the SET and RESET signals are inactive. When the capacitor midpoint voltage distribution becomes asymmetrical, either the first switching element $Q_4$ or the second switching element $Q_3$ comes into action. When the first switching element $Q_4$ becomes conductive and a RESET signal is supplied to the flip flop, the output of the flip flop will be forced to a logical 0 (low) value, while when the second switching element $Q_3$ becomes conductive and a SET signal is supplied to the flip flop, the output of the flip flop will be forced to a logical 1 (high) value. This results in an adaptation of the duty cycle, as will be explained hereafter.

Figure 3:
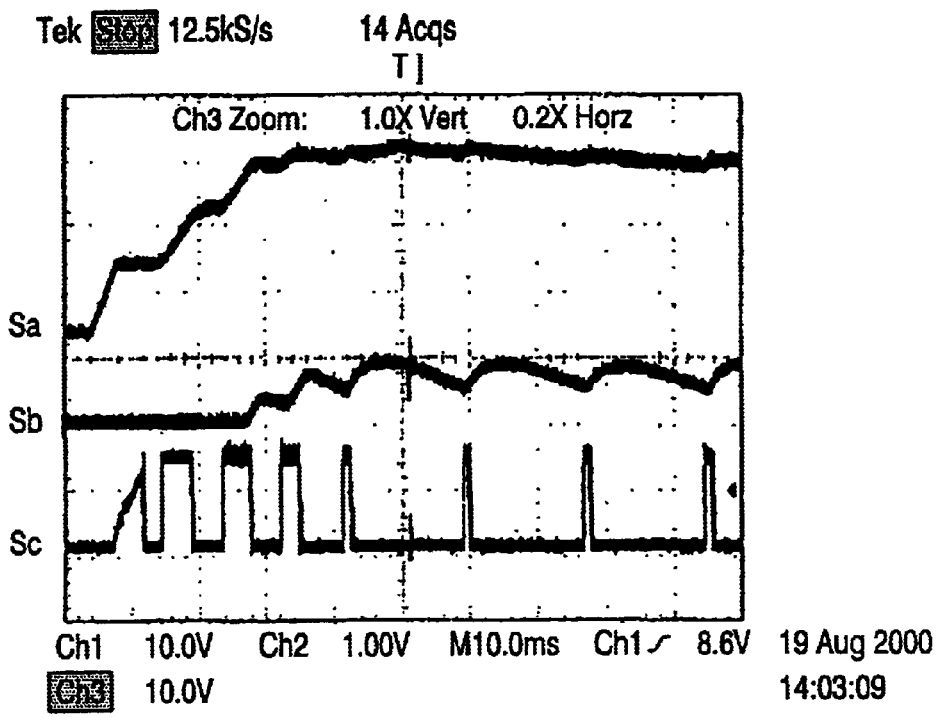
FIG. 3 shows a graph of the midpoint voltage of the capacitor series circuit, a control signal and the logic commutation signal in case of a midpoint voltage drifting upward.

FIG. 3 shows a graph of the midpoint voltage of the capacitor series circuit (signal $S_a$), a control signal for the SET/RESET input into the flip flop (signal $S_b$) and the logic commutation output signal (signal $S_c$) of the flip flop (FF) in case of an asymmetrical load causing the midpoint voltage to drift upward. After the ballast is turned on, the midpoint voltage of the electrolytic bridge capacitors rises fast due to the asymmetric load of the lamp. After each commutation period the midpoint voltage has risen a considerable amount. After a few commutation periods the midpoint voltage reaches the upper limit of +300 V. When the upper limit is reached, the first switching element $Q_4$ of the voltage difference determining circuit becomes conductive. When the control signal from the first switching element $Q_4$ (signal $S_b$) exceeds a certain minimum value, this causes activation of the RESET input terminal of the flip flop as a result of which the commutation output signal from the flip flop is forced to a logic 0 (low) value. The commutation output value will keep this low value until the midpoint voltage is reduced to a value lower than the upper limit. When the midpoint voltage level becomes lower than the upper limit value, the first switching element $Q_4$ is switched off and the commutation output signal will again follow the signal from the oscillator (divided by two).

As explained above, the LF commutation circuit is forced into asymmetrical operation. The resulting highly asymmetrical duty-cycle prevents the midpoint voltage to exceed a dangerous (upper) level (signal $S_c$) and hence to exceed the maximum voltage rating of the second bridge capacitor $C_2$.

Figure 4:
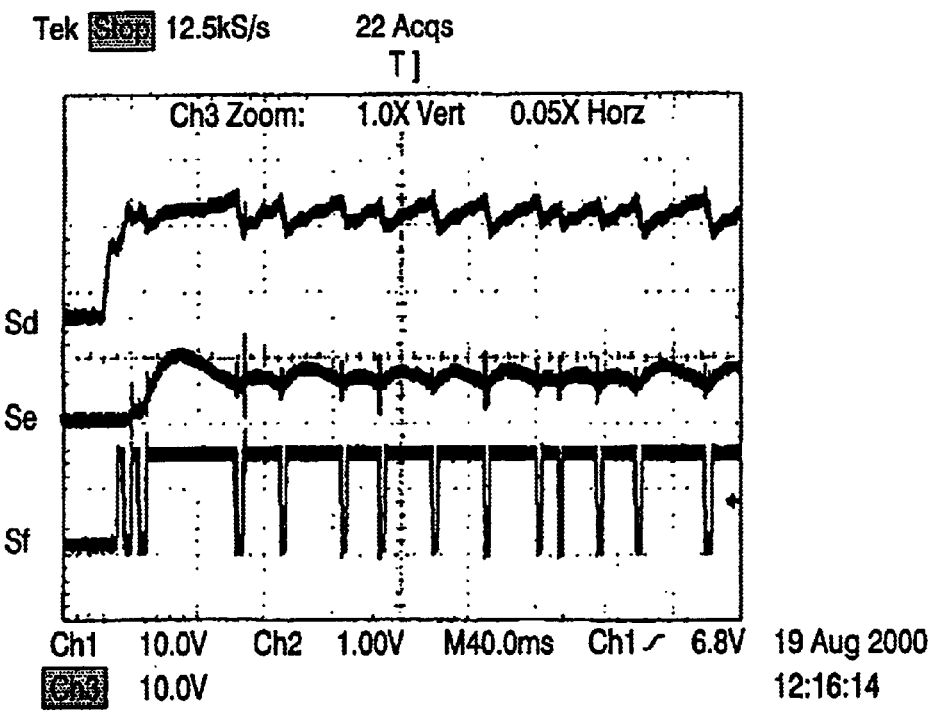
FIG. 4 shows a graph of the midpoint voltage of the capacitor series circuit, a control signal and the logic commutation signal in case of a midpoint voltage drifting downward.

FIG. 4 shows a graph of the midpoint voltage of the capacitor series circuit (signal $S_d$), a control signal for the SET/RESET input to the flip flop (signal $S_e$) and the logic commutation signal (signal $S_f$) in the opposite case of a midpoint voltage drifting downward. When the midpoint voltage reaches the lower limit, the second switching element $Q_3$ of the voltage difference determining circuit becomes conductive. This causes activation of the SET input terminal of the flip flop as a result of which the commutation output signal from the flip flop is forces to a logic 1 (high)

value. This means that the LF commutation circuit is forced into the opposite asymmetrical operation. The resulting highly asymmetrical duty-cycle prevents the midpoint voltage to exceed a dangerous (lower) value and hence to exceed the maximum voltage rating of the first bridge capacitor C1.

As shown in FIGS. 3 and 4, the power supplied in the direction in which the lamp is conducting (during asymmetrical operation) is limited. In such a period only during relatively short periods of time as compared with the original commutation period (typically $1/100$ s) power is supplied to the lamp. This is in particular relevant at the end of the life of the lamp and results in a lower overall power dissipation and less development of heat.

The present invention is not limited to the above described preferred embodiments thereof; the rights sought are defined by the following claims, within the scope of which many modifications can be envisaged.

What is claimed is:

1. Electronic ballast for operating a high-pressure discharge lamp, comprising a switched-mode power supply circuit (SMPS) for supplying a rail voltage Vrail to the high pressure discharge lamp, the power supply circuit comprising a half bridge commutating forward circuit including an inductance ($L_{hbcf}$), a capacitor circuit of a first capacitor (Cs1) and a second capacitor ($C_{s2}$) in series, the lamp (LA) being connectable between the inductance ($L_{hbcf}$) and a midpoint (M) between the first and second capacitor ($C_{s1}$, $C_{s2}$); a duty cycle control circuit, connected to the switched-mode power supply circuit, for controlling the duty cycle of the half bridge commutating forward circuit; and overvoltage protection means for protecting said capacitors against overvoltage, comprising:

a midpoint voltage detection circuit for detecting the voltage at the midpoint between the first and second capacitor, the midpoint voltage detection circuit providing a first signal representative of the detected midpoint voltage;

voltage difference determining circuit for determining the difference between the first signal and a second signal, which is representative of half the rail voltage, wherein the voltage difference determining circuit is connected to the duty cycle control circuit and the duty cycle control circuit is operable to change the duty cycle of the half bridge commutating forward circuit if the determined difference exceeds a maximum voltage difference.

2. Electronic ballast according to claim 1, wherein the duty cycle is increased when the midpoint voltage reaches an upper limit equal to half the rail voltage plus the maximum voltage difference and is decreased when the midpoint voltage reaches a lower limit equal to half the rail voltage minus the maximum voltage difference.

3. Electronic ballast according to claim 1 or 2, wherein the second signal representative of half the rail voltage is a predefined signal.

4. Electronic ballast according to claim 1 or 2, wherein the second signal representative of half the rail voltage is provided by a detection circuit connected to the rail voltage.

5. Electronic ballast according to claim 1, wherein the midpoint voltage detection circuit is a resistive divider connected with the rail voltage and the midpoint voltage.

6. Electronic ballast according to claim 4, wherein the rail voltage detecting circuit is a resistive divider connected to the rail voltage.

7. Electronic ballast according to claim 5, wherein the midpoint voltage detection circuit is substantially symmetrical to keep the resistive load symmetrical.

8. Electronic ballast according to claim 1, wherein the maximum voltage difference is a preset value in the order of 100 V.

9. Electronic ballast according to claim 1, wherein the duty cycle control circuit comprises a frequency oscillator connected in series with a flip flop, wherein the output of the flip flop is the logic commutation signal.

10. Electronic ballast according to claim 1, wherein the voltage difference determining circuit comprises a first switching element ($Q_4$) which is conductive when the midpoint voltage is at the upper limit and comprises a second switching element ($Q_3$) which is conductive when the midpoint voltage is at the lower limit.

* * * * *